Feb. 27, 1934.   P. TALMEY   1,948,974
IGNITION SYSTEM FOR COMBUSTION ENGINES
Filed March 21, 1931   2 Sheets-Sheet 1

Paul Talmey
INVENTOR

ATTORNEY

Feb. 27, 1934.  P. TALMEY  1,948,974
IGNITION SYSTEM FOR COMBUSTION ENGINES
Filed March 21, 1931   2 Sheets-Sheet 2

Paul Talmey
INVENTOR

BY
ATTORNEY

Patented Feb. 27, 1934

1,948,974

UNITED STATES PATENT OFFICE 1,948,974

IGNITION SYSTEM FOR COMBUSTION ENGINES

Paul Talmey, New Haven, Conn.

Application March 21, 1931. Serial No. 524,304

9 Claims. (Cl. 123—145)

My invention relates to ignition systems for combustion engines in which the explosive mixture is ignited by a continuous preheated ignition element within the cylinder, and has for its object to over-come the disadvantages of the hot bulb and spark ignition system common to-day.

I qualify my ignition element as preheated, in order to differentiate it from such igniters as hot bulb type of igniters, which receive their heat from the burning gas and not from an external source. I further qualify it to differentiate it from hot bulb type igniters which are preheated only in starting by calling mine a continuously preheated element, to show that it continually receives heat from a source, in whole or in part, which is external to the cylinder.

Inasmuch as my system requires no spark coil, timer or distributor with the necessary gearing and mechanical movements to bring about the timing, much of the first cost of installation of the spark plug type will be saved while preignition due to the hot bulb type is eliminated as my heating element changes temperature with the cylinder.

I wish to point out that under the generic term "internal combustion engine" is included the Diesel engine and that igniters are used in Diesel engines as well as ordinary Otto cycle and mixed cycle engines, the igniters in the Diesel engine being used largely for starting or as a booster. Therefore, although I am confining my explanation to the Otto cycle, I do not wish to limit myself to the Otto cycle alone. Furthermore, under the term "combustion engines" appearing in the title, I also wish to include those engines which utilize an external combustion chamber but in which there is a cycle of combustion.

Carbon and catalytic poisons cannot accumulate on the heating element as they are burnt off each stroke.

My invention is based upon the principle that under proper conditions a thin platinum element when in contact with a mixture of air and gasoline will become sufficiently hot to ignite the mixture. The speed of the effect is dependent upon the ratio of the mass to the exposed area and other dimensions of the element. For example, a coil should be made of as many turns per inch and as small a coil diameter as is practical. A gauze should be of fine mesh and as long and wide as convenient. The other factors are the initial temperature and the pressure of the mixture. The last two are controlled by the dimensions of the engine itself. This leaves the initial temperature of the ignition element as a factor which can be varied so as to control the explosions. In order to control the initial temperature with a variation in speed load, a control resistance may be put in series with the ignition element and exposed to the temperatures prevailing within the cylinder.

To provide for an increase in current for cold starting, a resistor made of a wire having a high temperature coefficient of resistance is inserted in the circuit in series with the plugs and is placed somewhere in the engine that will represent the average temperature of the engine. This may be some portion of the cooling system or the cylinder head or even immersed in the crankcase oil although I do not wish to limit myself to these places alone. The dimensions of this resistor depend on the design of the engine.

The foregoing and other features of my inventon will now be described in connection with the accompanying drawings forming part of this specification in which I have represented my ignition system for combustion engines in its preferred form, after which I shall point out more particularly in the claims those features which I believe to be new and of my own invention.

In the drawings:—

Figure 1:
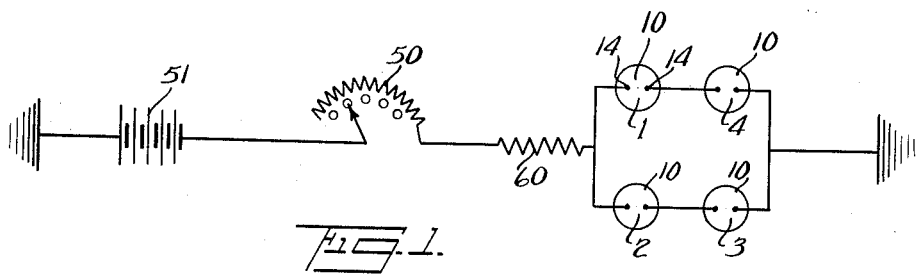
Figure 1 is a diagrammatic sketch of my system as connected for operation on a four cylinder engine, the cylinders being connected in series parallel.

In the carrying out of my invention I employ an ignition element comprising in its preferred form a plug 10 provided with a screw threaded portion 11 adapted to be inserted in the holes of a combustion engine now similarly provided for the usual spark plugs. The plug 10 is provided with a center portion 13 made of non-conducting material such as porcelain. Cast or moulded in the non-conducting portion 13 is a plurality of leads 14 which extend all the way through the non-conducting material. The top ends are provided with standard means 19 for attaching lead wires.

My ignition element 20 is fastened, preferably by welding, to the lower end of one of the lead wires 14 and to the support 15 and may take the form of a fine wire coil or gauze or fine foil which may be platinized to increase catalytic action. This element is made preferably of a substance catalytically active, having a high melting point, great strength, a sufficiently high specific resistance to generate sufficient heat with minimum current consumption, a low volatilization and oxidation rate and a low cost. This may be composite of two or more substances one plated or laid over the other in some manner, the inner substance to combine the properties of correct resistance, infusibility, strength and low cost.

I find the single substance that combines the greatest number of these properties to be rhodium, which has a melting point of 1950° C. moderate strength, very low volatilization rate, a good catalyst, moderate cost but low resistance. Platinum-iridium 30% alloy combines the properties of high melting point, only slightly inferior to rhodium, a good catalyst, high resistance, greater strength than rhodium but a much higher volatilization rate and cost.

An element composed of an inner core of platinum-iridium 30% and an outer surface of rhodium combines all the desirable properties of both but is comparatively expensive.

An element composed of a metal such as tungsten, tantalum or molybdenum adequately plated with rhodium would also combine all the properties desired except that of high resistance but in addition would be cheapest and very infusible and very strong.

Other more suitable materials having the properties desired as outlined may from time to time become available as the science of metallurgy and chemistry discloses them. For this reason I do not wish to limit myself to the above substances specifically mentioned.

Figure 2:
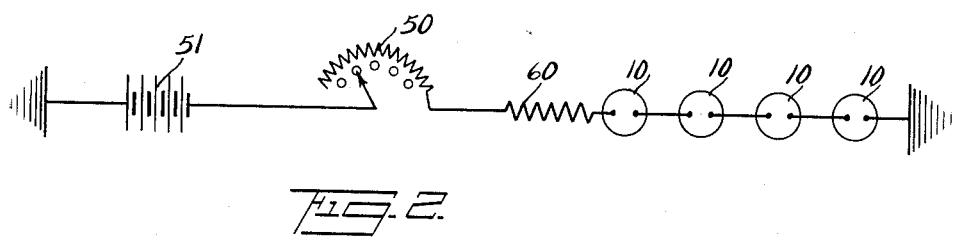
Figure 2 is the same as Figure 1 with the cylinders connected in series.
Figure 3:
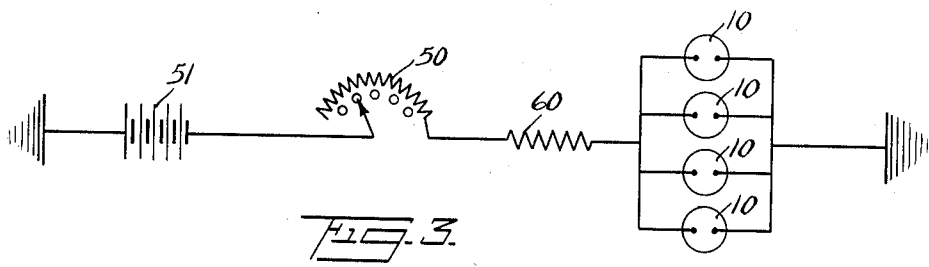
Figure 3 is the same as Figure 1 with the cylinders connected in parallel.

The control element 30 is connected from the supporting electrode 15 to the other lead wire 14 and when the plug is connected in the circuits shown in Figures 1, 2 and 3, the element 30 and element 20 are always in series.

Figure 4:
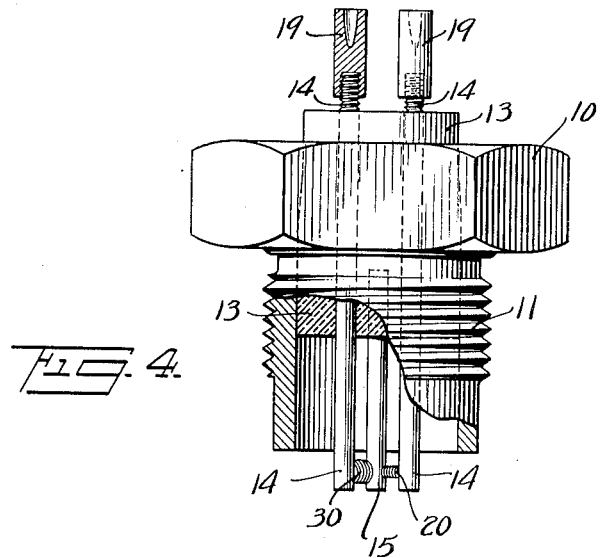
Figure 4 is an elevation in part section of a detail employed.
Figure 5:
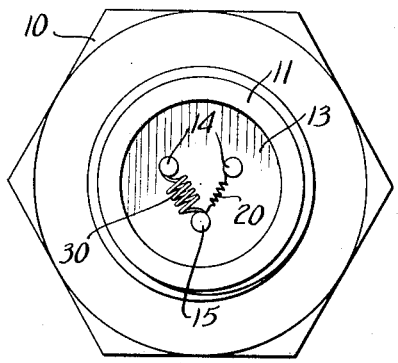
Figure 5 is the bottom view of the part shown in Figure 4.

With the form of plug illustrated in Figures 4 and 5 there are only two lead wires 14; to one is fastened the ignition element and to the other is fastened the control element, both the elements are fastened to the insulated supporting electrode 15.

Figure 6:
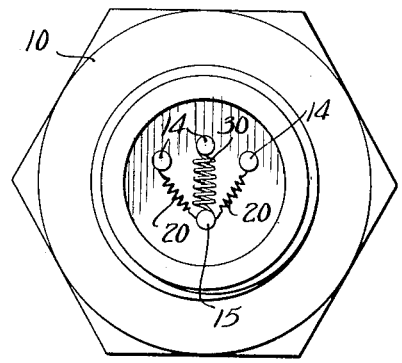
Figure 6 is a modification which I may employ.

With the plug shown in Figure 6 three lead wires are used to provide an additional ignition element as a spare in case the element is burnt out or otherwise destroyed.

In Figure 3 I have shown the plugs connected in parallel. I believe the following theoretical cycle of temperature change is imposed on the elements by the conditions within the cylinder.

During the intake stroke, the temperature of the ignition element decreases rapidly, due to the effect of the cold gas, and may reach a minimum somewhere near the end of this stroke. Assume that this minimum has been reached during the intake stroke. The ignition element then necessarily rises in temperature, due to the cessation of the cold stream of the intake gas.

Catalytic action comes into play causing further heating of the element and commences combustion on the surface of the element. Then under the influence of the compression the combustion spreads from the surface of the element throughout the cylinder. During the power stroke the temperature of both elements is raised and likewise their resistance as a result of which the current is cut down considerably.

The same principles apply even though a minimum is reached during the compression stroke as the rate of decrease of temperature with time is so greatly decreased, after the beginning of the compression stroke that there is only a difference in degree between the two cases. Ignition occurs at the proper time, due to the effects of compression, as well as the fact that the large time lag at low pressures would prevent pre-ignition in an engine turning over rapidly.

In order to automatically control the temperature of the ignition element 20 with a variation in engine speed or load a control element 30 made of wire of a material having a high temperature coefficient of resistance, such as iron, which may be nickel plated to prevent surface oxidation and hence inconstancy, is connected in series as shown in Figures 4, 5 and 6.

The usual type of igniter has no control at all except some crude adjustment which must be made while the engine is not running. For this reason these igniters have not proved generally necessary. The control element 30 is in automatic control, the purpose of which is to adjust the current through the ignition element for various changes in the conditions inside the cylinder. The manner in which these varying changes affect the control element is a very complex subject and is impossible to predict beforehand. However, it can be said that this control element, in series or otherwise connected to the ignition element, will affect the current through the ignition element, bearing in mind that the control element has a high or at least an appreciable coefficient of resistance in the condition of the cylinder gas which tend to cause, in an uncontrolled ignition element, an advance in timing will so affect the control element as to decrease the current through the ignition element. Likewise those variations in the cylinder gas which tend to retard the timing will so affect the control element as to increase the current through the ignition element. Thus it can be seen that the control element is a sort of ballast for the ignition element. For example, considering that the engine is running at constant speed but varying load, a change from a light load to a heavy load means a larger throttle opening, more intake gas per cycle and higher compression pressure. Obviously the compression pressure will tend to advance the timing. The larger volume of gas blowing over the ignition element will cool the ignition element, tending to retard the timing. These tendencies, though opposite, will probably not be equal. The first will probably be less than the second. Hence with an uncontrolled ignition element the timing will be retarded. If, however, there is a control element, the increased flow of gas over the control element will by means of the temperature resistance effect cause more current to flow through the circuit, thus tending to compensate for the retarding effect of the gases on the ignition element.

During the power stroke the increase in temperature of the control element produces a large increase in its resistance, thus cutting down the heat dissipated from the ignition element and thereby reducing the temperature of the latter. This prevents overheating and consequent failure of the ignition element. In addition, it decreases the amount of heat that must be carried away from the ignition element by the intake gases in order to complete the cycle of temperature changes.

It is obvious that a control element must necessarily be a compromise between all the various tendencies and that it will only produce an approximate compensation, but there is no ignition system to-day which is absolutely accurate. It is also obvious that the dimensions of the control element will be dependent upon the type of engine in which it is used as well as the dimensions of the ignition element with which it is used. I do not wish to limit myself to any theory which is offered in this specification as it is merely explanatory.

Since the ignition element varies in temperature similarly to the control element all temperature resistance effects described for the latter element must apply to the former the difference being largely that of degree, dependent on differences of dimensions and properties of the material.

In Figure 1, I have shown the cylinders in series parallel. As connected the plugs in cylinders 1 and 4 are connected in series and 2 and 3 are also in series. Since each one of these plugs has a control element the conditions in cylinder 1 will affect the temperature of the ignition element in cylinder 4 and vice versa. Likewise 2 and 3 will also affect each other. The advantage of this system over the parallel system is current economy. In addition it is quite possible that better timing may be effected by means of the controlling effect from the supplementary cylinder.

In the diagrammatic circuits shown in Figures 1, 2 and 3, I show a variable control resistance 50. This is what I plan to call my main control element, the resistor 30 being in each plug in series with the ignition element 20. The main resistor may be wholly variable, adjustable to partly variable, the object of which is to initially control the initial current from battery 51 passing through the plugs.

In the diagrams Figures 1, 2 and 3 I show a temperature control resistance 60 connected in series with the plugs and inserted either in the cylinder head, cooling system or immersed in the crankcase oil, or any other part that represents the average temperature of the engine. The object of this resistance is to permit increased current to flow through the ignition element when the engine is cold and to reduce the flow of current as the engine becomes hot. This may take the form of an insulating bobbin and its characteristics differ with engine design or capacity.

In these specifications and claims the term "temperature electrical resistance effect" is used. By this I refer to the phenomenon whereby the electrical resistance of a conductor is a function of the temperature of the material of which it is composed. The magnitude of this effect is measured by the well known "temperature coefficient of resistance".

I wish it distinctly understood that my ignition system herein illustrated and described is in the form in which I desire to construct it but that changes or variations may be made as may be convenient or desirable without departing from the salient features of my invention and I therefore intend the following claims to cover such modifications as naturally fall within the lines of invention.

I claim:—

1. An ignition plug comprising a metal body adapted to be screw threaded into a combustion chamber, said body provided with a center portion of nonconducting material, a plurality of leads extending through the nonconducting material, insulated from each other and from the metal body, a supporting member embedded in the nonconducting material, an ignition element connecting one lead to the supporting member, a control element connecting the other lead and the support.

2. The device of claim 1 with the addition that the ignition element is made of a catalytically active substance.

3. The device of claim 1 with the addition that the control element is made of a coil of wire having an appreciable temperature coefficient of resistance.

4. An ignition system for internal combustion engines comprising igniting the inflammable mixture by means of an electrically preheated ignition element and an auxiliary control element to further control the heat produced by the current through the ignition element by means of the temperature electrical resistance effect in this control element.

5. The systems disclosed in claim 4 with the addition of a resistance in series with the plugs, the resistance of which varies with the temperature of the engine cylinder to further control the current through the plugs with changes in temperature of the engine.

6. An ignition plug comprising an ignition element and a control element and a means of supporting and insulating said elements.

7. An ignition system for internal combustion engines, comprising igniting the inflammable mixture by a continuously electrically preheated ignition element, controlling the current through this element by electrical resistance internal to the cylinder to further regulate the point at which ignition begins.

8. An ignition system for multiple cylinder combustion engines comprising igniting the inflammable mixture in each cylinder by a continuously electrically preheated ignition element within the cylinder, controlling the temperature of this element by the condition of the gas in the cylinder about to explode and the condition of the gases in another cylinder to further regulate the point at which ignition begins.

9. An ignition system for internal combustion engines comprising igniting the inflammable mixture by a continuously electrically preheated ignition element and varying the heat generated by the current through the element by the temperature electrical resistance effect in the ignition element.

PAUL TALMEY.